INVENTOR.
LEONARD L. HAYES
BY
Wells & St. John
ATTYS.

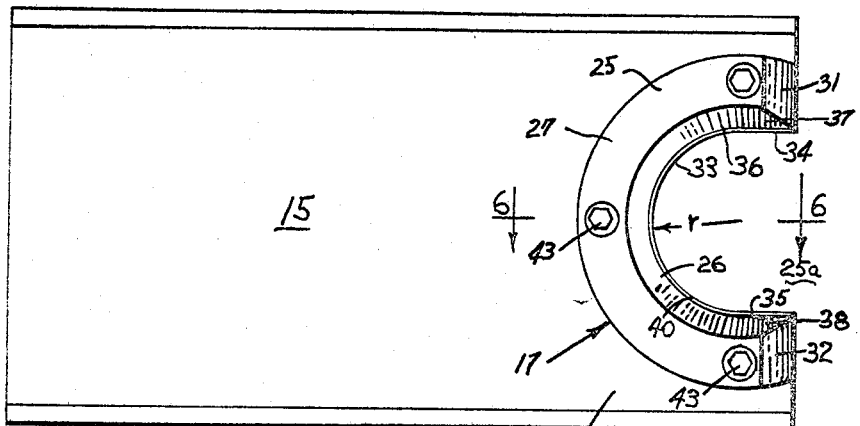
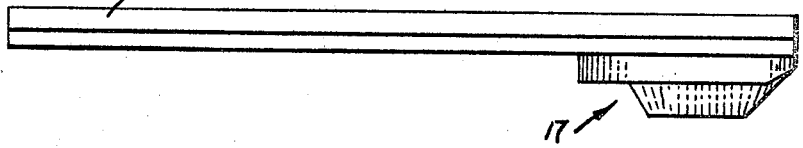
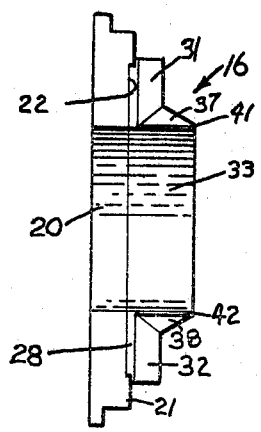
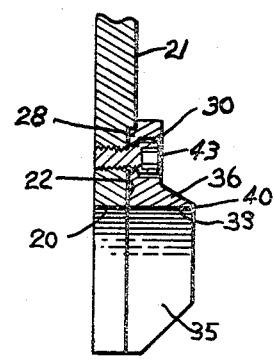

United States Patent Office 3,480,052
Patented Nov. 25, 1969

3,480,052
CHUCKS FOR VENEER LATHE LOADERS
Leonard L. Hayes, Lewiston, Idaho, assignor to Potlatch Forests, Inc., Lewiston, Idaho, a corporation of Delaware
Filed June 30, 1967, Ser. No. 650,358
Int. Cl. B27c 7/00
U.S. Cl. 144—209                                           1 Claim

ABSTRACT OF THE DISCLOSURE

The disclosure describes a chuck for veneer lathe loaders that has a C-shaped annular wedge sector 26 that penetrates a log end for supporting the log. The sector 26 has a cylindrical inner surface 33 that has a radius greater than the radius of a lathe spindle so that the spindle may be moved through the chuck into engagement with the log end. The shape of the chuck permits the rotation of the log while the chuck is in engagement with the log end. The side opening of the chuck is sufficient to permit the radial movement of the chuck with respect to the spindle when the spindle is inserted through the chuck. The wedge sector 26 has a conical surface 36 that intersects with the surface 33 forming a thin annular edge 40 for facilitating the penetration of the log end.

BACKGROUND OF THE INVENTION

This invention relates to chucks for veneer lathe loaders and more particularly to non-rotatable chucks for engaging the ends of a log to support the log while the log is being moved into axial alignment with opposing veneer lathe spindles.

In the manufacture of rotary cut plywood veneer, logs are axially positioned between lathe spindles that rotate the logs while knives engage the cylindrical surface of the logs to peel the logs. It is very important that each log is accurately aligned between the spindles to efficiently peel the log and to reduce the bending force applied to the log during the peeling operation.

Many of the log loaders for veneer lathes grasp a log by the log ends spaced from the center axis and move the log into position between spindles. The spindles are then moved inwardly to engage the ends of the logs along the center axis. The chucks of the log loaders are then released. Subsequently the lathe spindles are powered to rotate the log to begin the peeling operation. After a log is peeled down to the core the spindles move outwardly to release the core. The power is then released from the spindles so that the spindles will stop rotating in preparation for receiving a new log. The time required to stop the rotation of the spindles and then to again start the rotation of the spindles is considerable and increases the cycle time for each peeling operation.

One of the principal objects of this invention is to reduce the peeling cycle time by providing a non-rotating chuck for a long loader that engages and supports the log in such a manner that it is unnecessary to stop the rotation of the spindles between cycles.

An additional object of this invention is to provide a nonrotating loading chuck that is concentric with the log axis to facilitate the accurate alignment of the log between the spindles.

A further object of this invention is to provide a non-rotating loading chuck that engages the end of the log and is capable of supporting the log while the log is rotating.

An additional object of this invention is to provide a non-rotating loading chuck that concentrically engages the end of the log and which may be removed from the log after the spindle engages the log end without interfering with the spindle.

A further object of this invention is to provide a non-rotating loading chuck that is self-cleaning.

Other advantages and objects of this invention will become clear upon reading the following description of a preferred embodiment shown in the accompanying drawings.

BRIEF DESCRIPTION OF THE DRAWINGS

A preferred embodiment of this invention is shown in the drawings, in which:

FIG. 3 is a side elevation view of the chuck;

FIG. 4 is a plan elevation view of the chuck;

FIG. 5 is an end view of the chuck; and

FIG. 6 is a cross sectional view of the chuck taken along line 6—6 in FIG. 3.

DESCRIPTION OF THE PREFERRED EMBODIMENT

This invention concerns nonrotatable chucks that are mounted on the ends of the arms of a lathe loader or charger, for positioning logs on a veneer lathe. The veneer lathe rotates the log while veneer knives engage the cylindrical surface of the log to peel the log to form veneer sheets.

Figure 1:
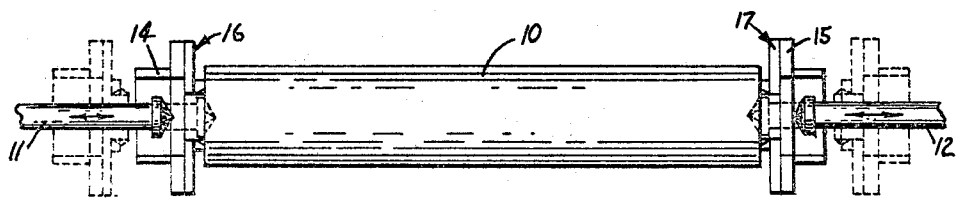
FIG. 1 is a front elevation schematic view showing two opposing chucks of a veneer lathe loader engaging and supporting a log axially between two opposing veneer lathe spindles.

Referring now to FIG. 1, there is shown for purposes of illustration a log 10 axially aligned between opposing lathe spindles 11 and 12. The spindles 11 and 12 are capable of being moved axially to move into and out of engagement with the ends of the log. The spindles 11 and 12 are capable of being rotated to rotate the log 10.

The loading mechanism for positioning the logs axially between the spindles 11 and 12 includes loader arms or plates 14 and 15 that extend parallel to the ends of the log. Opposing nonrotatable chucks 16 and 17 are affixed to the ends of the arms 14 and 15 respectively for engaging the ends of the log. The loader arms 14 and 15 are often referred to as side charger plates. Each loader arm 14 and 15 and each chuck 16 and 17 is the mirror image of the other, therefore in describing the detail structure reference will only be made to one.

Figure 2:
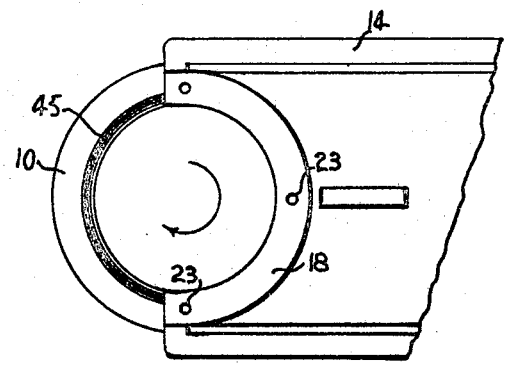
FIG. 2 is a fragmentary enlarged side view showing one of the chucks engaging a log end.

As may be particularly seen in FIG. 2, each loader arm has a C-shaped slot 18 formed in the end thereof to form an inner cylindrical end surface 20 (FIG. 5). The face 21 of the arm has an annular groove 22 (FIGS. 3, 5 and 6) formed about the slot 18 for facilitating the mounting of a chuck. Bolt holes 23 are formed through the loader arm to facilitate the mounting of the chuck.

Each of the chucks 16 and 17 has a C-shaped annular body 25 with a side opening 25a. The annular body 25 has an annular wedge sector 26 for penetrating the end of the log and a bracket section or backing plate 27 for securing to the loader arms. The bracket section 27 also limits the depth of penetration of the wedge sector 26 into the log end.

The bracket section 27 has an annular rear ridge 28 (FIGS. 5 and 6) that is complementary to the annular groove 22 for fitting within the groove 22. Counter sunk bolt apertures 30 are formed in a bracket section for facilitating the mounting of the chuck to the arm. The bracket section 27 has bevelled ends 31 and 32 (FIG. 3) that facilitate the rotation of the log on the non-rotatable chuck.

The annular wedge sector 26 has a cylindrical inner surface 33 (FIGS. 5 and 6) with a radius R. The radius R is greater than the radius of the spindles. The cylindrical inner surface 33 has an arc of approximately 180 degrees. The cylindrical inner surface 33 flares out into flat inner surfaces 34 and 35 at the ends of the annular wedge sector 26. The distance between the flat inner surfaces 34 and 35 is greater than the diameter of the spindle so that when the spindle engages the log end the chuck may be readily removed for picking up a subsequent log in preparation for the next peeling cycle.

The annular wedge sector 26 has a conical outer surface 36 (FIG. 3) with an arc of approximately 180 degrees. The conical outer surface 36 flows into contoured outer end surfaces 37 and 38 that communicate with the bevelled surfaces 31 and 32 respectively at the ends of the bracket section 27.

The cylindrical inner surface 33 and the conical outer surface 36 intersect to form a thin annular wedge edge 40 to facilitate the penetration of the wedge into the end of the log. The flat inner surfaces 34 and 35 intersect with the contoured outer end surfaces 37 and 38 to form end edges 41 and 42 (FIG. 5) respectively that facilitate the rotation of the log while the chuck engages the log end. Bolts 43 are mounted through the apertures 23 and 30 to secure the chuck to the loader arm.

When a chuck moves into engagement with a log end, the annular wedge sector 26 penetrates into the log to form a substantially semi-circular groove co-axially with the longitudinal axes of the log. When the log is rotated the wedge sector cuts a complete circular groove 45 in the log end with one of the end edges 41 or 42 forming the leading cutting edge (FIG. 2). When the log is rotated the annular wedge sector 26 occupies approximate 180 degrees of the circular groove 45. This is sufficient to support the rotating log.

In operation, the lathe loader positions the chucks 16 and 17 alongside the ends of the log. It should be appreciated that since the C-shaped chuck is open, the operator can readily adjust the loader arms 14 and 15 so that the chucks 16 and 17 are aligned co-axially with the longitudinal axis of the log. The operator then causes the loader arms 14 and 15 to move toward one another to penetrate the annular wedge sectors 26 of the chucks into the ends of the log to form semi-circular grooves with the ends of the log in engagement with the bracket sections 27. Each bracket section 27 may be thought of as functioning as a stop. The operator then manipulates the loader to move the log axially between the rotating spindles 12 and 13. The rotating spindles 12 and 13 are then moved toward each other through the respective non-rotatable chucks 16 and 17 and into engagement with the ends of the log. When the spindles 11 and 12 move into engagement with the ends of the log the log begins to rotate. As the log begins to rotate the wedge sectors 26 cut full circular grooves 45 in the ends of the log. Thus it may be said that the non-rotatable chucks 16 and 17 are capable of supporting the log even though the log is rotating.

After the rotating spindles 11 and 12 are in full engagement with the end of the log so that there is no need for support by the chucks 16 and 17, the operator actuates the loader to move the loader arms 14 and 15 apart to disengage the chucks 16 and 17 with the ends of the log. The operator then operates the loader to move the loader arms 14 and 15 radially from the veneer lathe for picking up a subsequent log.

It should be appreciated that because of the particular shape of the chucks 16 and 17, bits and pieces of the log ends that may be broken off in the operation flow off the chucks in the normal course of operation. Thus it may be said that the chucks are self-cleaning.

It should be appreciated that the above described embodiment is simply illustrative of the principles of this invention. Therefore, only the following claim is intended to define the invention.

What is claimed is:

1. In a veneer lathe having opposed rotating lathe spindles, a veneer lathe loader for grasping and supporting a log by its ends and moving the log into a position centered between the opposing lathe spindles and for permitting the lathe spindles to engage and rotate the log while the lathe loader supports the log;

two spaced lathe loader arms;

opposing non-rotatable chucks secured to the lathe loader for supporting the log ends;

each of said chucks having a C-shaped annular wedge sector having an internal radius of greater than the diameter of the lathe spindles;

said C-shaped annular wedge sector having a cylindrical surface and a conical surface intersecting to form a thin annular edge for axially penetrating the log end coaxially with the log axis and the spindle axes; and said C-shaped annular wedge sector having contoured outer end surfaces that are flared from the conical surface to the cylindrical surface to form thin end edges for cutting the log end as the log is rotated to form a full circular support groove in the log end.

References Cited

FOREIGN PATENTS 1,024,705  2/1958  Germany.

DONALD R. SCHRAN, Primary Examiner